May 30, 1950  G. M. KOMAR  2,509,236
DRUM GAUGE
Filed Oct. 7, 1944
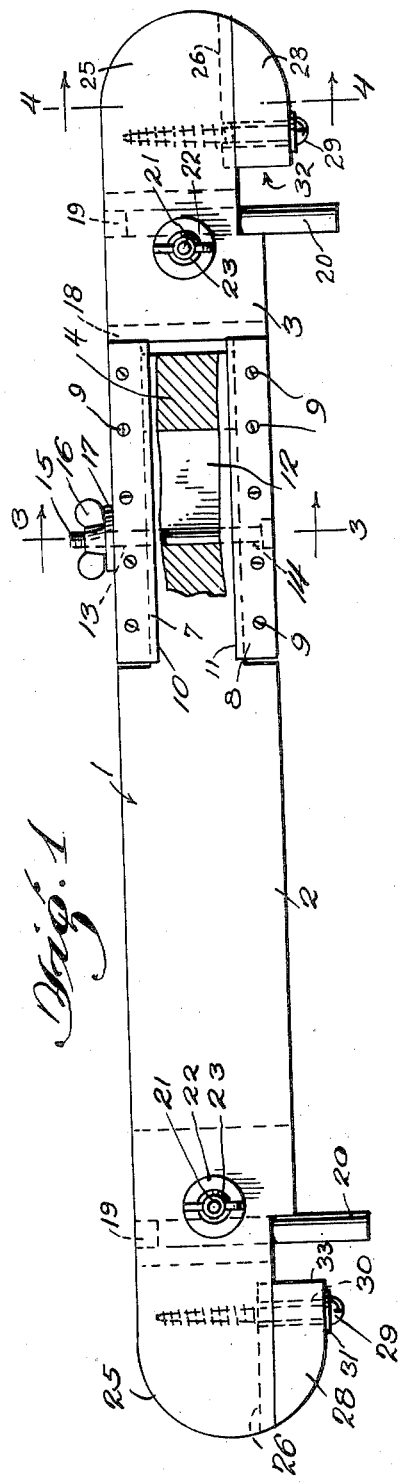
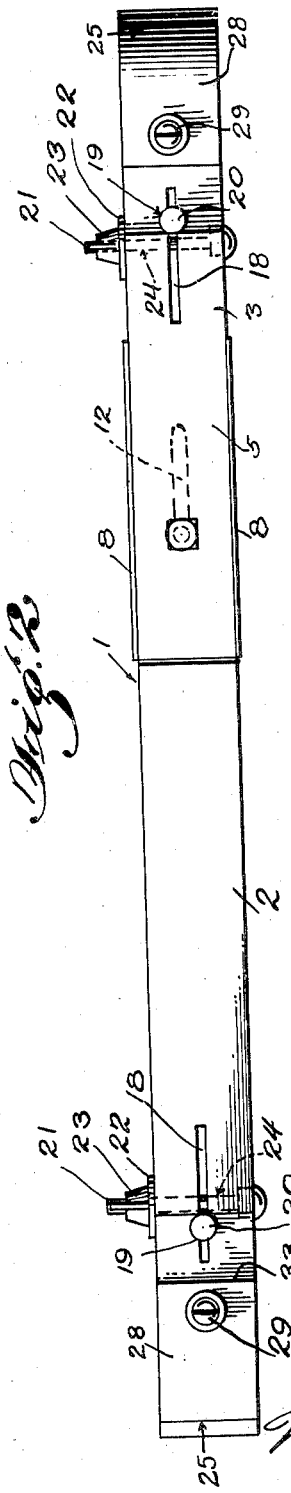
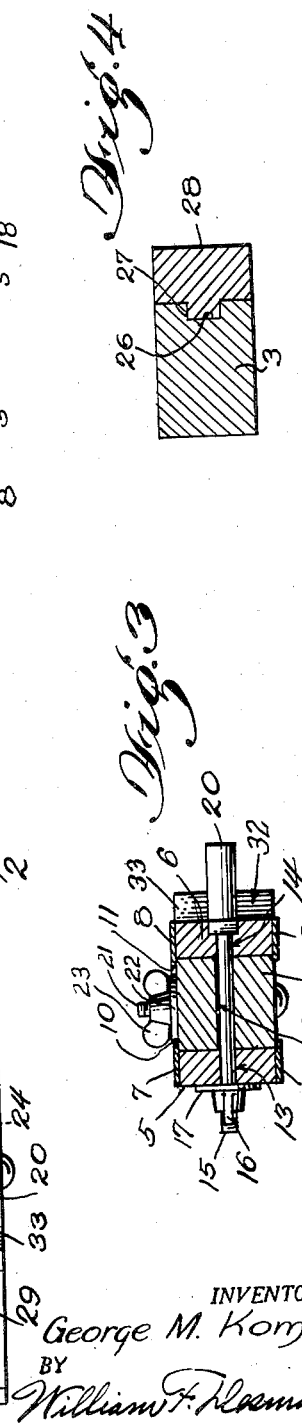
INVENTOR.
George M. Komar
BY
William F. Hammond
ATTORNEY Patented May 30, 1950

2,509,236

UNITED STATES PATENT OFFICE 2,509,236

DRUM GAUGE

George M. Komar, New York, N. Y.

Application October 7, 1944, Serial No. 557,711

1 Claim. (Cl. 33—174)

(Granted under the act of March 3, 1883, as amended April 30, 1928; 370 O. G. 757)

The invention described herein, if patented may be manufactured and used by or for the Government for government purposes, without the payment to me of any royalty thereon.

This invention relates to a gauge, and more particularly to a drum gauge for the inspection of the ends or heads of metal drums or similar containers to determine whether their dimensions are within prescribed limits.

The invention has for its object the provision of a gauge of the type described having means permitting it to be quickly and easily adjusted to test any or all of several different dimensions of drums or similarly shaped objects to determine whether such dimensions are within prescribed limits.

A further object of the invention is to provide a gauge whereby dimensions such as, for example, the diameter of a drum, clearance space above the drum head and the width and height of chimes, may all be tested by a single instrument, in a single operation thereof.

A further object of the invention is the provision of a gauge of the character described wherein the parts, which perform each of the several measuring functions which the gauge is adapted to make, are independently adjustable, whereby types of drums differing in the dimensions of their respective parts, and for which different tolerances may have been established, can all be tested with the same instrument.

Still further objects of the invention are to provide an instrument of the class referred to of simple design and rugged construction having no complicated or expensive parts, but capable of being made of materials easily obtainable, and in which the parts are easily replaceable when worn or broken.

The invention consists of a gauge comprising an adjustable length bar, carrying adjustable gauge pins and provided with adjustable gauge blocks, all combining in a single instrument to perform the various measuring functions for which the gauge is designed.

In order that the invention may be readily understood, reference is had to the accompanying drawing, forming a part of this specification and in which:

Figure 1 is a side elevation of the gauge, partly in section.

Figure 2 is a bottom plan view of the same.

Figure 3 is a sectional view on the line 3—3 of Figure 1, looking in the direction of the arrows, and Figure 4 is a sectional view on the line 4—4 of Figure 1, looking in the direction of the arrows.

As shown in the drawings the invention comprises a bar 1 of hardwood or any other suitable material, having the requisite rigidity, formed of two flat sections 2 and 3 having slidably interfitting ends whereby the frame may be varied in length to accommodate it for use with drums of different head dimensions. The interfitting end of the bar section 2 is formed with a tongue 4 for sliding engagement with a pair of arms 5 and 6 formed on the cooperating end of the other bar section 3. The arms 5 and 6 of bar section 3 are encased in metal guides 7 and 8 of U-shaped cross-section, which extend around three sides of the arms 5 and 6 and are secured thereto in any suitable manner, as by screws 9. The sides of the metal guides 7 and 8 extend inwardly of the arms 5 and 6, as indicated by 10 and 11 in Figures 1 and 3, and form therewith, grooves for the slidable reception of the tongue 4. The tongue 4 has a slotted hole 12 extending longitudinally thereof as best seen in Figures 1 and 2, and the arms 5 and 6 are provided with holes 13 and 14 for the reception of a bolt 15 passing through the slotted hole 12 by which means tongue 4 is retained in the grooves. A wing nut 16 and washer 17 are provided on the bolt 15 whereby when the nut 16 is loosened the bar sections 2 and 3 may be extended to adjust the length of the bar 1 and when the nut 16 is tightened the sections are held against relative movement.

Each of the sections 2 and 3 is provided with a slot 18 and a hole 19 for the reception of an adjustable pin 20. The pin 20 is held in place by means of a bolt 21 extending through a hole 24 and provided with washer 22 and wing nut 23. When the wing nut 23 is tightened the slot 18 is slightly contracted and the pin 20 is securely held in place. Each of the sections 2 and 3 has a rounded end 25 and a groove 26 in its lower side as best seen in Figure 4, which receives a tongue 27 formed on a block 28. The block 28 is held in position by a screw 29 extending through an oversized hole 30 therein and provided with a washer 31. Upon loosening the screw 29 block 28 can be moved longitudinally in the groove 26, a distance permitted by the oversized hole 30. In this manner the spaces 32 between the pins 20 and the surfaces 33 of blocks 28 are adjustable for the testing of drums having different chime dimensions.

To adjust the gauge for use it may be positioned on the head of a standard drum, the length of the bar being adjusted by loosening the wing nut 16 and sliding the sections 2 and 3 apart until the pins 20 engage the inside of the rim or chime of the drum. The wing nut 16 is then tightened to hold the sections in adjusted relation. The wing nuts 23 are loosened and the pins 20 adjusted in the holes 19 so that their lower ends contact the head of the drum, the central portion of the bar 1 being clear of the drum head and any plug or closure therein, and the bar making contact with the chimes of the drum in the spaces between the pins 20 and the blocks 28. The wing nuts 23 are then tightened again to hold the pins in adjusted position. The screws 29 are loosened permitting the blocks 28 to move back and forth a distance permitted by the oversize holes 30, and the blocks are moved to contact the outer surface of the drum. The screws 29 are then tightened to hold the blocks 28 in adjusted position. It will of course be understood that the gauging surfaces of the instrument need not be brought directly into contact with the surfaces of the standard, but may be adjusted to clear the same by certain distances depending upon the established tolerances for the dimensions of the particular type of article being inspected. The gauge may also be put into condition for use by measuring the distances which it is proposed to establish as allowable, and adjusting the various parts of the instrument accordingly.

In use, when the gauge is placed on the head of a drum to be tested, it will be immediately apparent from the fit of the instrument thereon whether its dimensions conform to established requirements within the tolerance permitted.

It will thus be apparent that the gauge contemplated by this invention provides a means whereby drums can be tested conveniently and rapidly for the accuracy of their dimensions by a single manipulation of the instrument.

Other measurements can also be checked by the gauge by making appropriate adjustments of its parts, such for example, as the clearance distances of plugs or closures in the drum head below the level of the chimes. The location and alignment of plugs and closures in the drum heads may also be tested. Thus, for example, when the bar 1 is extended so that the pins 20 contact the rim or chimes of a drum at opposite ends of a diameter of the drum head, a closure, located at the center of the drum head will lie directly beneath the bar. The pins 20 can be extended from the side of the frame 1 opposite the blocks 28 when it is desired to make measurements for which either the pins 20 or the blocks 28 alone can be used.

While the invention has been described as used in the inspection of drums it will be apparent that it can also be used for measurement of any object having a configuration to which the various parts of the gauge can be applied.

Having thus described the invention, what is claimed as new and desired to secure by Letters Patent is:

In a drum gauge, an extensible bar having a flat under-surface adapted to contact the edges of the chimes of a drum, a pair of spaced-apart pins mounted in the bar and projecting beyond the under-surface thereof for engaging the interior faces of the chimes of the drum and the drum head, means for adjusting the extent of projection of the pins beyond the under-surface of the bar, and an adjustably mounted block secured to the under-surface of the bar at each end thereof and provided with a face extending at right angles to the under-surface of the bar and adapted to engage the exterior faces of the chimes.

GEORGE M. KOMAR.

REFERENCES CITED

The following references are of record in the file of this patent:

UNITED STATES PATENTS

| Number | Name | Date |
| --- | --- | --- |
| 340,883 | Kells | Apr. 27, 1886 |
| 697,090 | Keef | Apr. 8, 1902 |
| 1,142,097 | Hill | June 8, 1915 |
| 1,857,951 | Gadd | May 10, 1932 |
| 2,076,659 | Masson | Apr. 13, 1937 |

FOREIGN PATENTS

| Number | Country | Date |
| --- | --- | --- |
| 750,286 | France | Aug. 8, 1933 |